United States Patent
Lewis

(10) Patent No.: US 7,969,474 B2
(45) Date of Patent: Jun. 28, 2011

(54) CAMERA, ENCODER, AND MODULATOR IN SAME ENCLOSURE

(75) Inventor: Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 1161 days.

(21) Appl. No.: 11/710,360

(22) Filed: Feb. 23, 2007

(65) Prior Publication Data

US 2008/0204568 A1    Aug. 28, 2008

(51) Int. Cl.
*H04N 5/228* (2006.01)
*H04N 9/64* (2006.01)

(52) U.S. Cl. ............................... 348/222.1; 348/720

(58) Field of Classification Search ............. 348/222.1
See application file for complete search history.

(56) References Cited

U.S. PATENT DOCUMENTS

| | | | |
|---|---|---|---|
| 3,833,756 A * | 9/1974 | Kumagai et al. | 348/101 |
| 5,877,821 A * | 3/1999 | Newlin et al. | 348/724 |
| 6,011,579 A * | 1/2000 | Newlin | 348/14.08 |
| 7,557,862 B2 * | 7/2009 | Hundhausen et al. | 348/485 |
| 2002/0028680 A1 * | 3/2002 | Jenkins et al. | 455/454 |
| 2002/0041328 A1 * | 4/2002 | LeCompte et al. | 348/144 |
| 2003/0222975 A1 * | 12/2003 | Klosterman | 348/40 |
| 2004/0259499 A1 * | 12/2004 | Oba et al. | 455/41.2 |
| 2006/0141941 A1 * | 6/2006 | Zacks et al. | 455/73 |
| 2007/0182827 A1 * | 8/2007 | Sassa | 348/211.2 |

* cited by examiner

Primary Examiner — Lin Ye
Assistant Examiner — Amy Hsu

(57) ABSTRACT

An RF signal source having a camera that provides a camera output, an encoder that encodes the camera output in a compressed digital format, and a modulator that digitally encodes and modulates the compressed camera output and that provides the digitally encoded, modulated, and compressed camera output as an RF output of the RF signal source. The camera, the encoder, and the modulator may be contained in an enclosure. Additionally or alternatively, the encoder, the modulator, and at least part of the camera may be formed on a semiconductor substrate.

28 Claims, 1 Drawing Sheet

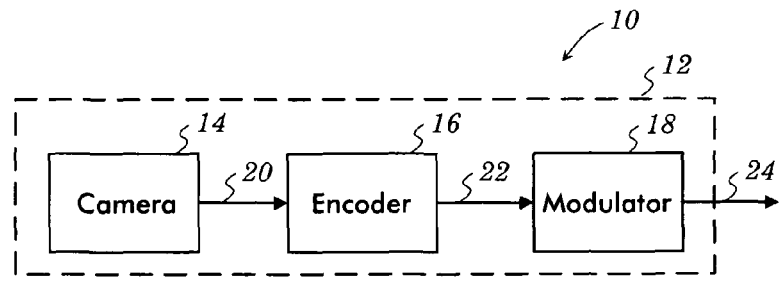
*Figure 1*
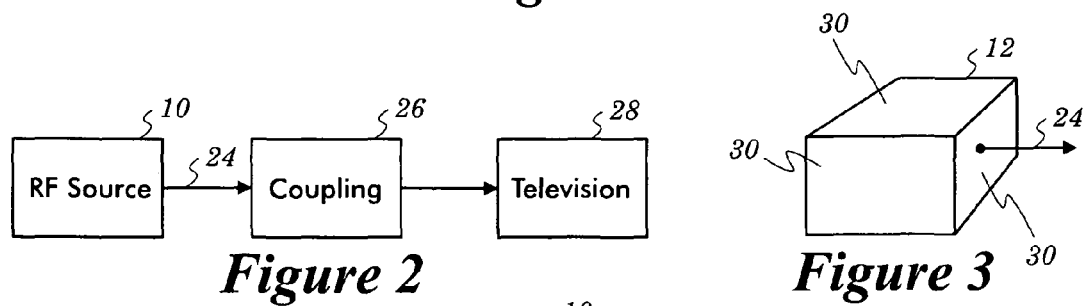
*Figure 2*
*Figure 3*
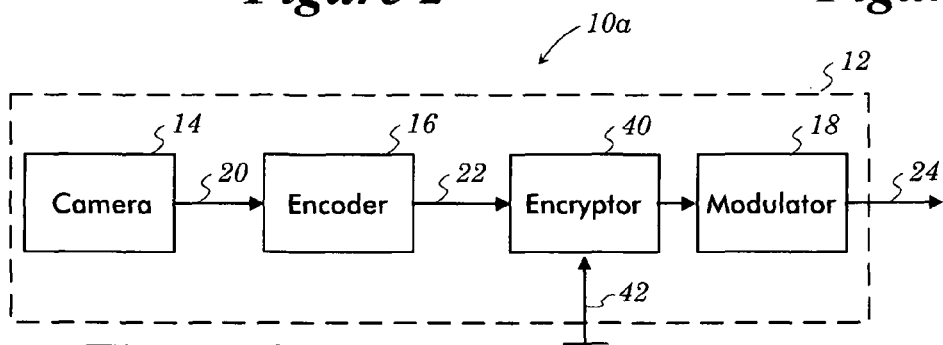
*Figure 4*
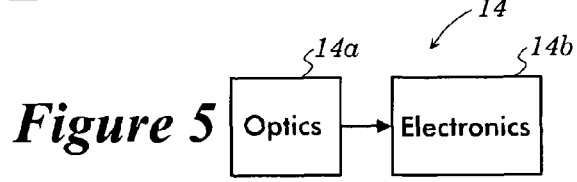
*Figure 5*
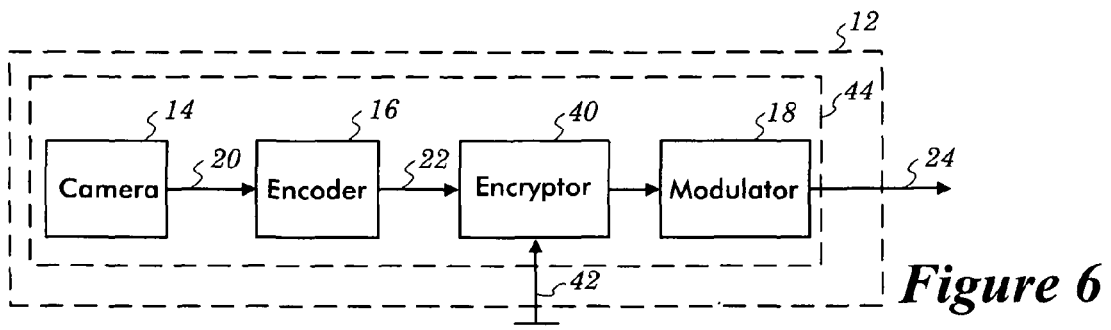
*Figure 6*

CAMERA, ENCODER, AND MODULATOR IN SAME ENCLOSURE

TECHNICAL FIELD

The technical field of this application relates to an RF signal source having a camera, an encoder, and a modulator contained in the same enclosure.

BACKGROUND

Typically, the output of a video camera may be coupled over a cable to a television. In the case of a digital television such as a television that meets the ATSC standard A/53, the output of the camera might be either analog or digital and can be coupled to the television over an interface cable. The length of the cable must be relatively short, such as on the order of 3-5 feet, because, if the cable is longer, the signal on the cable may become seriously degraded preventing good reception by the television or may not be received at all preventing any reproduction of the picture.

The present invention is intended to overcome this and/or other problems.

SUMMARY OF THE INVENTION

According to one aspect of the present invention, an RF signal source provides an RF output and comprises a camera, an encoder, a modulator, and an enclosure. The camera provides a camera video output. The encoder receives the camera video output, encodes the camera video output into a compressed digital format, and provides a compressed camera video output. The modulator receives the compressed camera video output, digitally encodes and modulates the compressed camera video output, and provides the digitally encoded, modulated, and compressed camera video output as the RF output. The enclosure contains the camera, the encoder, and the modulator.

According to another aspect of the present invention, an integrated circuit RF signal source provides an RF output and comprises a semiconductor substrate, a camera, an encoder, and a modulator. The camera provides a camera output, and the camera is at least partially formed on the semiconductor substrate. The encoder receives the camera output, encodes the camera output in a compressed digital format, provides a compressed camera output, and is formed on the semiconductor substrate. The modulator receives the compressed camera-output, digitally encodes and modulates the compressed camera output, provides the digitally encoded, modulated, and compressed camera output as the RF output, and is formed on the semiconductor substrate.

According to still another aspect of the present invention, an RF signal source provides an RF output and comprises a camera, an MPEG encoder, a VSB modulator, and a single enclosure. The camera provides a camera output. The MPEG encoder receives the camera output, encodes the camera output, and provides the encoded camera output as an MPEG transport stream output. The VSB modulator receives the MPEG transport stream output, digitally encodes and modulates the MPEG transport stream output, and provides the digitally encoded and modulated MPEG transport stream output as the RF output. The single enclosure contains the camera, the MPEG encoder, and the VSB modulator.

BRIEF DESCRIPTION OF THE DRAWING

These and other features and advantages will become more apparent from the detailed description below when taken in conjunction with the drawings in which:

FIG. 1 illustrates an enclosure containing a camera, an encoder, and a modulator according to one embodiment of the present invention;

FIG. 2 shows the enclosure of FIG. 1 coupled to a television;

FIG. 3 shows an example of the enclosure of FIG. 1 in three dimensions;

FIG. 4 illustrates an enclosure containing a camera, an encoder, an encryptor, and a modulator according to another embodiment of the present invention;

FIG. 5 illustrates the camera in additional detail; and

FIG. 6 illustrates the camera, the encoder, the encryptor, and the modulator of FIG. 4 formed as a single integrated circuit.

DETAILED DESCRIPTION

As shown in FIG. 1, an RF signal source 10 has an enclosure 12 that contains a camera 14, an encoder 16, and a modulator 18. The camera 14 may be any type of camera that provides a video and/or audio camera output 20. The video and/or audio camera output 20, for example, may be an uncompressed video and/or audio camera output. For example, the camera 14 may be a charge coupled device (CCD) camera. The camera output 20 may comprise, for example, composite video, component video, or a digitally formatted signal such as HDMI. As shown in FIG. 5, the camera 14 may include input optics 14a and electronics 14b.

The encoder 16, for example, may be an MPEG encoder such as an MPEG-2 or MPEG-4 encoder that compresses the video in the camera output 20. Assuming that the camera output 20 is an analog output, the MPEG encoder, if used, would first convert the analog signal to a digital signal before compression. The encoder 16 may also implement, as desired, compression for any audio in the camera output 20. Such compression, for example, may be implemented as Dolby compression, DTS, or any other audio compression scheme. The encoder 16 provides an encoder output 22 containing an MPEG transport stream in the case where the encoder 16 is an MPEG encoder. Alternatively, the encoder 16 could be a Windows Media or any other type of compression encoder.

The modulator 18, for example, may be a VSB modulator (such as one pursuant to the ATSC standard A/53), a QAM modulator, a COFDM modulator, etc. that modulates the encoder output 22 onto a desired RF channel frequency. The desired RF channel frequency, for example, may be the channel frequency typically associated with channel 3 or 4. Accordingly, the modulator 18 has an RF signal output 24 that contains an RF signal having the desired RF channel frequency. The modulator 18, for example, may also be arranged to further encode, such as trellis encode and Reed-Solomon encode, the encoder output 22 so as to provide error protection and correction.

As shown in FIG. 2, the RF signal output 24 of the RF signal source 10 is coupled by a coupling 26 to an RF input of a television or set top box 28. The coupling 26, for example, may be a cable, such as a coaxial cable, that couples the RF signal output 24 of the RF signal source 10 to an RF cable input of the television or set top box 28. This cable can have a substantially longer length than the 3-5 foot cables heretofore used to couple cameras to televisions. For example, such a cable used for the coupling 26 could have a length on the order of 25-50 feet or more.

Alternatively, for greater flexibility, the coupling 26 may be a pair of antennas, one connected to the RF signal output 24 of the RF signal source 10 and the other connected to an RF antenna input of the television or set top box 28. In this alternative, the signal from the antenna connected to the RF signal output 24 of the RF signal source 10 is communicated over the air to the antenna connected to the RF antenna input of the television or set top box 28.

The RF signal source 10 has several advantages over the prior art. For example, as mentioned above, because the RF signal output 24 is an RF output, and because of the nature of a digitally RF encoded signal, the signal from the RF signal source 10 can be effectively communicated over longer cable distances than has heretofore been the case without any significant degradation in signal quality. As also suggested above, because the RF signal output 24 is an RF output, it can be wirelessly communicated to the television or set top box 28, which increases flexibility in the use of the RF signal source 10.

Moreover, when an encoder that compresses the camera output 20 is used for the encoder 16, the compressed signal can be stored in less memory space by a recording device. Such a recording device may be separate from or part of the television or set top box 28. Furthermore, an inexpensive RF distribution system can be used to distribute the RF signal output 24 because the RF signal output 24 is a digital RF signal. Therefore, an inexpensive RF splitter can be used instead of more expensive routers or other switching devices that would be required for distributing a digital baseband signal.

Another advantage of the RF signal source 10 is that, because the signal from the camera 14 can be A/D (analog to digital) converted by the encoder 16 located close to the camera 14 and because of error correction capabilities of the RF transmission system (channel coding by the modulator 18), the RF signal output 24 can be made relatively immune to interference.

Further, a low cost digital television receiver can be used for the television or set top box 28 instead of a more expensive data monitor in order to view the picture without sacrificing video quality.

Additionally, the RF signal source 10 can be used as a security camera in a commercial or other establishment such that the video signal can be transmitted over RF to a security office and/or archiving device.

As shown in FIG. 3, the enclosure 12, for example, may include a plurality of outer walls 30 that are suitably fastened together. For example, the outer walls 30, when fastened together, may be arranged to form a cavity that contains the camera 14, the encoder 16, and the modulator 18. The cavity may comprise separate compartments divided by inner walls of the enclosure 12 such that each compartment contains a respective one of the camera 14, the encoder 16, and the modulator 18, or the cavity may be a continuous cavity that contains the camera 14, the encoder 16, and the modulator 18. The enclosure 12 can have any number of outer walls 30 arranged to form the cavity in any number of shapes. The outer walls 30 may be fastened together using any suitable fastening systems. For example, such fastening systems may be mechanical fastening systems relying on one or more of the following: screws, snap together joints, adhesive, heating, etc. The enclosure 12 is a single enclosure that contains all of the camera 14, the encoder 16, and the modulator 18.

An alternative RF signal source 10a is shown in FIG. 4 and has the enclosure 12 that contains the camera 14, the encoder 16, and the modulator 18 of the RF signal source 10 shown in FIG. 1. As before, the camera 14 provides the video and/or audio camera output 20, and the encoder 16 compresses the camera output 20 to provide the encoder output 22. The RF signal source 10a further includes an encryptor 40 that suitably encrypts the encoder output 22 and provides the encoded and encrypted output to the modulator 18. A control 42 is provided to control the encryptor 40. For example, the control 42 may selectively enable and disable the encryption process provided by the encryptor 40. Accordingly, the RF signal output 24 is an encoded camera output that is encrypted and/or modulated as an RF output signal.

Certain modifications of the present invention have been discussed above. Other modifications of the present invention will occur to those practicing in the art of the present invention.

For example, with the possible exception of the input optics 14a required for the camera 14, all of the components of the RF signal source 10 or 10a (e.g., the electronics 14b, the encoder 16, the modulator 18, and/or the encryptor 40) can be integrated onto a single semiconductor substrate 44 of a single integrated circuit as shown in FIG. 6. This integration greatly reduces power, space, and heat dissipation requirements.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An RF signal source for providing an RF output comprising:
   a camera that provides a camera video output;
   an encoder that receives the camera video output, that encodes the camera video output into a compressed digital format, and that provides a compressed camera video output;
   a modulator that receives the compressed camera video output, that digitally encodes and modulates the compressed camera video output, and that provides the digitally encoded, modulated, and compressed camera video output as the RF output, wherein the encoder, the modulator, and at least a portion of the camera comprise a single integrated circuit; and,
   an enclosure that contains the camera, the encoder, and the modulator.

2. The RF signal source of claim 1 wherein the enclosure comprises outer walls mechanically fastened together.

3. The RF signal source of claim 1 wherein the camera comprises camera optics coupled to the integrated circuit.

4. The RF signal source of claim 1 wherein the encoder comprises an MPEG encoder.

5. The RF signal source of claim 1 wherein the modulator comprises a VSB modulator.

6. The RF signal source of claim 1 wherein the modulator comprises a QAM modulator.

7. The RF signal source of claim 1 wherein the modulator comprises a COFDM modulator.

8. The RF signal source of claim 1 wherein the modulator comprises a VSB modulator, and wherein the encoder comprises an MPEG encoder.

9. The RF signal source of claim 8 wherein the enclosure comprises outer walls mechanically fastened together.

10. The RF signal source of claim 1 further comprising an encryptor, wherein the encryptor is coupled between the encoder and the modulator, and wherein the encryptor encrypts the compressed camera video output.

11. The RF signal source of claim 1 wherein the modulator trellis encodes and Reed-Solomon encodes the compressed camera video output.

12. An integrated circuit RF signal source for providing an RF output comprising:
- a semiconductor substrate;
- a camera that provides a camera output, wherein the camera is at least partially formed on the semiconductor substrate;
- an encoder that receives the camera output, that encodes the camera output in a compressed digital format, that provides a compressed camera output, and that is formed on the semiconductor substrate; and,
- a modulator that receives the compressed camera output, that digitally encodes and modulates the compressed camera output, that provides the digitally encoded, modulated, and compressed camera output as the RF output, and that is formed on the semiconductor substrate.

13. The integrated circuit RF signal source of claim 12 further comprising an enclosure that contains the semiconductor substrate, the camera, the encoder, and the modulator, wherein the enclosure comprises outer walls fastened together to create a cavity containing the semiconductor substrate, the camera, the encoder, and the modulator, and wherein the cavity comprises a continuous cavity.

14. The integrated circuit RF signal source of claim 12 wherein the encoder comprises an MPEG encoder.

15. The integrated circuit RF signal source of claim 12 wherein the modulator comprises a VSB modulator.

16. The integrated circuit RF signal source of claim 12 wherein the modulator comprises a QAM modulator.

17. The integrated circuit RF signal source of claim 12 wherein the modulator comprises a COFDM modulator.

18. The integrated circuit RF signal source of claim 12 wherein the modulator comprises a VSB modulator, and wherein the encoder comprises an MPEG encoder.

19. The integrated circuit RF signal source of claim 12 wherein the semiconductor substrate comprises a single semiconductor substrate.

20. The integrated circuit RF signal source of claim 12 wherein the camera comprises camera optics not formed on the semiconductor substrate.

21. The integrated circuit RF signal source of claim 12 further comprising an encryptor, wherein the encryptor is coupled between the encoder and the modulator, and wherein the encryptor encrypts the compressed camera output.

22. The integrated circuit RF signal source of claim 12 wherein the modulator trellis encodes and Reed-Solomon encodes the compressed camera video output.

23. An RF signal source for providing an RF output comprising:
- a camera that provides a camera output;
- an MPEG encoder that receives the camera output, that encodes the camera output, and that provides the encoded camera output as an MPEG transport stream output;
- a VSB modulator that receives the MPEG transport stream output, that digitally encodes and modulates the MPEG transport stream output, and that provides the digitally encoded and modulated MPEG transport stream output as the RF output, wherein the MPEG encoder, the VSB modulator, and at least a portion of the camera comprise a single integrated circuit; and,
- a single enclosure that contains the camera, the MPEG encoder, and the VSB modulator.

24. The RF signal source of claim 23 wherein the single enclosure comprises outer walls mechanically fastened together.

25. The RF signal source of claim 24 wherein outer walls are mechanically fastened together so as to create a cavity containing the camera, the MPEG encoder, and the VSB modulator.

26. The RF signal source of claim 25 wherein the cavity comprises a continuous cavity.

27. The RF signal source of claim 23 wherein the camera comprises camera optics coupled to the integrated circuit.

28. The RF signal source of claim 23 further comprising an encryptor, wherein the encryptor is coupled between the MPEG encoder and the VSB modulator, and wherein the encryptor encrypts the encoded camera output.

* * * * *